United States Patent [19]

Matsui et al.

[11] 4,102,962

[45] Jul. 25, 1978

[54] PROCESS FOR MANUFACTURING CONCRETE ARTICLES OF IMPROVED INITIAL STRENGTH AND LONG-TERM STRENGTH

[75] Inventors: Fumio Matsui; Shigeo Hayashi, both of Yokohama; Eiji Komada, Kawasaki, all of Japan

[73] Assignees: Showa Denko K.K.; Misawa Homes Institute of Research and Development, both of Tokyo, Japan

[21] Appl. No.: 678,376

[22] Filed: Apr. 19, 1976

[51] Int. Cl.$^2$ .............................................. C04B 15/12
[52] U.S. Cl. ..................................... 264/82; 106/104; 264/333; 264/DIG. 43
[58] Field of Search ............... 106/104; 264/DIG. 43, 264/82, 333

[56] References Cited

U.S. PATENT DOCUMENTS

| | | | |
|---|---|---|---|
| 744,431 | 11/1903 | Sutcliffe | 264/DIG. 43 |
| 904,923 | 11/1908 | Berglund | 264/DIG. 43 |
| 3,510,326 | 5/1970 | Miki | 106/104 X |
| 3,664,854 | 5/1972 | Kokuta | 106/104 X |

*Primary Examiner*—Thomas P. Pavelko
*Attorney, Agent, or Firm*—Armstrong, Nikaido, Marmelstein & Kubovcik

[57] ABSTRACT

A process for manufacturing concrete articles of improved initial strength and long-term strength from a hydraulic cement composition capable of forming predominantly tobermorite group crystalline calcium silicate hydrate is provided. The hydraulic cement composition, having incorporated therein specified amounts of alumina cement and calcium hydroxide and/or oxide, is initially set in a mold and after the concrete so formed is allowed to stand at a temperature of not higher than approximately 40° C for a period of 2 hours to 5 days, the concrete is finally cured at an elevated temperature and pressure.

5 Claims, 2 Drawing Figures

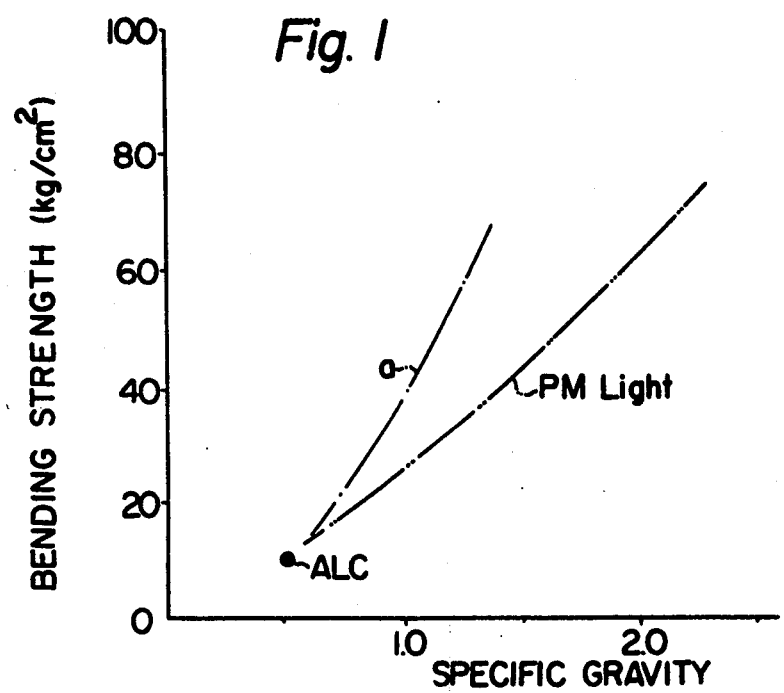
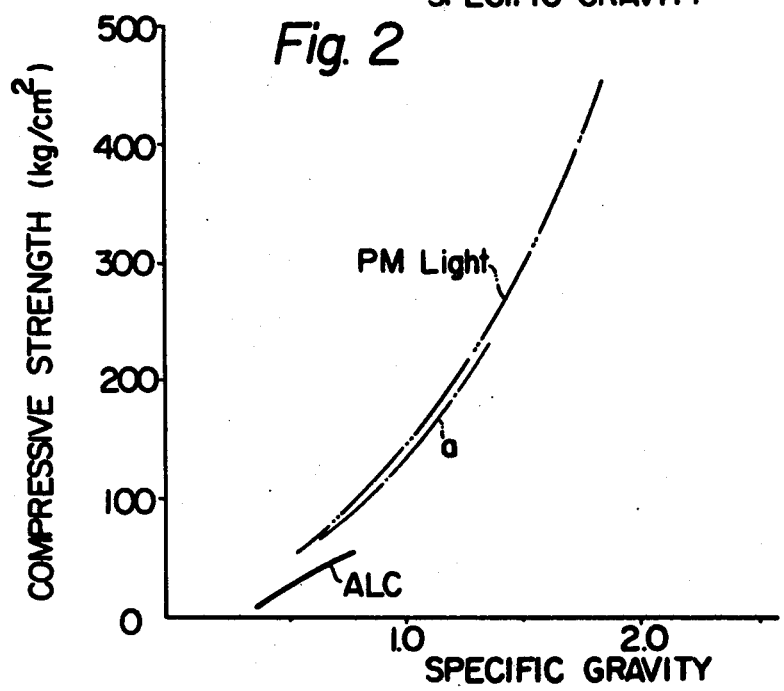

PROCESS FOR MANUFACTURING CONCRETE ARTICLES OF IMPROVED INITIAL STRENGTH AND LONG-TERM STRENGTH

This invention relates to a process for manufacturing concrete articles from a hydraulic cement composition capable of forming predominantly tobermorite group crystalline calcium silicate hydrate when cured at elevated temperature and pressure, wherein the hydraulic cement composition exhibits a short setting time and improved initial and long-term strength.

By the term "initial strength" used herein is meant the strength determined immediately after the cast cement composition is removed from a mold wherein it is initially set for a period of less than 30 minutes. By the term "long-term strength" used herein is meant the strength determined after the concrete is finally cured at an elevated temperature and pressure.

The term "hydraulic cement composition" used herein is intended to include any cement which is capable of forming predominantly crystalline calcium silicate hydrate, popularly called tobermorite group hydrate, when the cement composition is set initially and finally cured at an elevated temperature and pressure, for example, at 160° to 180° C and saturated steam pressure. It includes, for example, Portland cement, slag cement, silica cement, flyash cement, a mixture of silica sand and lime, or a mixture of two or more of these cements.

The term "calcium hydroxide and/or calcium oxide" used herein is intended to include not only pure calcium hydroxide and/or calcium oxide, but also the materials predominantly comprised of calcium oxide and/or calcium hydroxide such as lime, dolomite and limestone.

In the construction industry, there has been a long felt need for a cement composition which can set within a relatively short period into a hard but light-weight mass with sufficient strength to withstand demolding. However, if an initial strength of the desired level is developed in as short a period as possible, most hydraulic cement compositions become poor in long-term strength.

Japanese laid-open patent application No. 52216/1974 discloses a rapid hardening hydraulic cement composition comprised of alumina cement, limes and a setting retarder containing both a sulfonic acid or sulfonate anionic surface active agent and at least one compound selected from citric acid, tartaric acid and their salts. This cement composition exhibits a short and controllable setting time and an initial strength of the desired level. It further exhibits improved long-term strength as compared with most known hydraulic cement composition. However, its long-term strength is still not satisfactory.

A main object of the present invention is to provide a process for manufacturing concrete articles wherein the hydraulic cement composition exhibits short and controllable setting time and improved initial strength and long-term strength.

Other objects and advantages will be apparent from the following description.

In accordance with the present invention, there is provided a process for manufacturing a concrete article of improved initial strength and long-term strength from a hydraulic cement composition capable of forming predominantly tobermorite group crystalline calcium silicate hydrate, which comprises the steps of:

(1) setting initially in a mold at a temperature of not higher than 40° C said hydraulic cement composition having incorporated therein 10 to 35% by weight, based on the weight of said hydraulic cement composition, of alumina cement and 5 to 30% by weight, based on the weight of the alumina cement and expressed in terms of the weight of calcium hydroxide, of calcium hydroxide and/or calcium oxide;

(2) after demolding the concrete so formed, allowing the concrete to stand at a temperature of not higher than approximately 40° C for a period of 2 hours to 5 days, and then;

(3) curing the concrete at an elevated temperature and pressure.

In general, alumina cement is a mixture of compounds each containing $Al_2O_3$ and $CaO$ at a certain molar ratio, which is prepared by melting or semi-melting the raw materials such as bauxite and limestone in a furnace such as a rotary kiln or an electric furnace, rapidly cooling the molten material and then grinding the cooled material. Although alumina cement generally exhibits a relatively short setting time, it is not satisfactorily short. The setting or curing time of alumina cement greatly varies depending upon the temperature. For example, it is possible that alumina cement will not set in 12 hours at a temperature of approximately 30° C. Further, alumina cement is poor in long-term strength. Such disadvantages seem to be due to the fact that alumina cement is hydrated by the following course of reaction.

(1) $C.A + H \rightarrow C.A.H_{10}$
(2) $C.A + H \rightarrow C_2.A.H_8 + A.H_3$
(3) $C.A.H_{10} \rightarrow C_2.A.H_8 + A.H_3$
(4) $C_2.A.H_{10} \rightarrow C_3.A.H_6 + A.H_3$
(5) $C_2.A.H_8 + A.H_3 \rightarrow C_3.A.H_6 + A.H_3$ where C, A and H are $CaO$, $Al_2O_3$ and $H_2O$, respectively. At a temperature of lower than approximately 30° C, reaction (1) predominantly occurs at the initial stage and reactions (3) and (5) or reaction (4) occur at the latter stage. In contrast, at a temperature of higher than approximately 30° C, reactions (2) and (5) predominantly occur. The higher the temperature, the shorter the period of time in which alumina cement is converted to stable $C_3.A.H_6$ and $A.H_3$. However, hardening at such high temperature results in concrete articles of poor long-term strength. Therefore, in actual practice alumina cement is neither cast at a high temperature nor cured in steam.

It is known that an alumina cement composition having Portland cement incorporated therein exhibits a short setting time and, particularly, when the ratio by weight of alumina cement to Portland cement is approximately 80/20, said composition hardens rapidly. However, such composition containing a predominant amount of alumina cement is not advantageous for cost considerations.

It is also known that a mixture of alumina cement, Portland cement and lime or the like exhibits a short setting time, and; its setting time may be made controllable by the addition of a setting retarder such as chelate compound of an oxycarboxylic or ketocarboxylic acid or its salt, such as calcium 2-ketogluconic acid. However, such mixture is still not advantageous because of poor long-term strength.

One example will be illustrated which shows that a mixture of Portland cement, calcium hydroxide and alumina cement is inferior in long-term strength to Portland cement mortar. That is, batches of mortar comprising Portland cement, calcium hydroxide and alumina cement were prepared and cured in a wet state in a normal manner. The amount of alumina cement was as shown in Table I, below, and the amount of calcium hydroxide was 20% by weight based on the weight of alumina cement. The specific gravity of the cured batches of mortar was 1.8, as measured after drying. Compressive strength of the cured batches of mortar, as determined according to Japanese Industrial Standard R5210, was as shown in Table I.

Table I

| Run No. | Amount of alumina cement (wt.%) | Amount of calcium hydroxide (wt.%) | Compressive strength (kg/cm$^2$) | | |
|---|---|---|---|---|---|
| | | | 3 days | 7 days | 28 days |
| 1 | 0 | 0 | 192 | 296 | 421 |
| 2 | 5 | 1 | 104 | 209 | 277 |
| 3 | 10 | 2 | 44.4 | 173 | 254 |
| 4 | 20 | 4 | 29.4 | 144 | 181 |

The composition, which is formed into concrete articles by the process of the invention, comprises a hydraulic cement composition hereinbefore defined, alumina cement and calcium hydroxide and/or oxide. The amount of alumina cement is 10 to 35% by weight, preferably 10 to 20% by weight, based on the weight of the hydraulic cement composition. When the amount of alumina cement is less than the lower limit, the resulting composition does not set to the acceptable initial strength in a reasonable period of time. In this connection, it has been found that the minimum acceptable initial strength may be approximately 5 to 20 kg/cm$^2$ provided that the initially set concrete is carefully handled for demolding. In contrast, when the amount of alumina cement is more than the upper limit, the long-term strength is reduced.

The amount of calcium hydroxide and/or oxide is 5 to 30% by weight based on the weight of alumina cement and expressed in terms of the weight of calcium hydroxide. The amount of calcium hydroxide and/or oxide should preferably be minimum for the requirement of the short setting time. When the materials predominantly comprised of calcium oxide and/or calcium hydroxide, such as limestone and dolomite, are used, the amounts of these materials should be 5 to 30% by weight calculated in terms of the amount of pure calcium hydroxide. Further, it is to be noted that, when the hydraulic cement composition to be formed into tobermorite group crystalline calcium silicate hydrate is a mixture containing calcium oxide or calcium hydroxide such as a mixture of silica sand and lime, 5 to 30% by weight, based on the weight of said mixture, of calcium oxide and/or calcium hydroxide should be used besides the calcium oxide and/or hydroxide contained in said mixture.

The above-mentioned composition exhibits a short and controllable setting time. The desired initial strength can be developed in approximately ten to thirty minutes even with a light-weight concrete having a dry specific gravity of e.g. 0.6. The setting of this composition should be carried out at a temperature of not higher than 40° C, preferably from approximately 20° to 40° C, because the initial strength becomes poor at a higher temperature. This composition appears to be hydrated through the course of reactions 2 and 5, hereinbefore mentioned, at a temperature of less than approximately 40° C. However, when the temperature exceeds approximately 40° C, the conversion to $C_3.A.H_6$ becomes rapid and the strength is reduced.

Although the hydraulic cement composition mixture exhibits a short setting time, it hardens very slowly and the long-term strength is low if the demolded concrete is cured in a normal manner. This seems to be because, first, hydrated products of alumina cement and calcium hydroxide cover unhydrated cement particles, thereby preventing the unhydrated cement particles from being in contact with water, and second, undesirable conversion of hydrated alumina cement takes place. It now has been found that these defects can be obviated by the process wherein the demolded concrete after the initial setting is stored, i.e. allowed to stand at a temperature of not higher than approximately 40° C for a period of at least 2 hours but no more than 5 days, and then, cured at elevated temperature and pressure.

When the demolded concrete is allowed to stand at a temperature of higher than approximately 40° C, it is poor in long-term strength. In contrast, when the temperature is excessively low, the concrete is liable to crack. It is preferable to store the concrete at a temperature of approximately 20° C to approximately 40° C and in a moist atmosphere of 100% relative humidity.

The period of time the demolded concrete is allowed to stand is at least 2 hours but not more than 5 days. When the period is less than 2 hours, the desired compressive strength does not develop. Also when the period exceeds 5 days, the formed tobermorite crystalline changes to the form of a flat plate, as can be observed by a scanning-type electron microscope, leading to reduction of the compressive strength. A preferable period is from 5 hours to 1 day.

The above-mentioned storing at not higher than 40° C for 2 hours to 5 days is important for the desired long-term strength. This is in striking contrast to a process wherein only the hydraulic cement composition is used. That is, in this process, the period of time from completion of the initial setting to the beginning of the final curing does not influence the long-term strength.

The stored concrete is then finally cured at an elevated temperature and pressure. In general, the concrete is maintained at a temperature of 150° C to 200° C and a saturated steam pressure in an autoclave for a period of 3 to 10 hours. The preferable temperature is 160° to 180° C. It has been found that the alumina cement used is completely converted to the stable $C_3.A.H_6$ by this final curing.

For the purpose of further strengthening or extending the concrete, additives which are called reinforcing material or extender or filler may be incorporated into the hydraulic cement composition mixture. The additives include, for example, sand, fly ash, slag, red mud, perlite, mineral fibers and organic fibers.

The process of the invention may be employed for the manufacture of gas concrete articles and foamed concrete articles. It is advantageous particularly for the latter.

In general foamed concretes are advantageous over gas concrete in that: first, the specific gravity can be voluntarily controlled; second, uniform closed-cell foams are easily formed; third, a large article of an irregular shape section is obtainable, and; fourth, aggregates can be incorporated in a relatively large amount. However, foamed concretes have a defect such that a long period, usually twelve or more hours, is required for the initial setting of the foamed cement slurry. This defect is obviated by the employment of the process of the invention.

Further, the process of the invention results in concrete articles of improved compressive and bending strengthes. Thus, this process is beneficial particularly for the manufacture of concrete parts in factories.

The invention will be further illustrated by the following examples.

EXAMPLE 1

A stirrer was charged with 8 liters of water followed by the addition of 30 g of sodium dodecylbenzene-sulfonate and 15 g of sodium citrate. After the content was stirred to be formed into minute uniform foams, 9.6 kg of Portland cement, 2.4 kg of alumina cement, 0.48 kg of calcium hydroxide and 4.0 kg of finely divided silica sand were added to the foams followed by stirring for a period of approximately 2 minutes to obtain a foamed concrete slurry. The slurry was placed in a mold and, after it was maintained at about 20° C for approximately 20 minutes, it was removed from the mold. The block so formed exhibited an initial compressive strength of 5 kg/cm$^2$. The block was allowed to stand in a moist atmosphere for 1 day at 30° C and, then, cured in an autoclave at 180° C and 10 atom over a period of 8 hours. After being dried, the strength of the block was tested. It had a specific gravity of 0.576 and exhibited a compressive strength of 82.5 kg/cm$^2$, as determined according to JIS A1114, and a bending strength of 34.4 kg/cm$^2$, as determined according to JIS A1106.

EXAMPLE 2

Following the general procedure set forth in Example 1, light-weight foamed concrete blocks, having a specific gravity of 0.576, were prepared wherein the period of time for which the demolded blocks were allowed to stand at 30° C in a moist atmosphere was varied as shown in Table II. The concrete blocks exhibited strengthes shown in Table II.

Table II

| Run No. | Storing period (m=minutes, d=days) | Compressive strength (kg/cm$^2$) | Bending strength (kg/cm$^2$) |
| --- | --- | --- | --- |
| 1 | 0 m | 59.8 | 32.5 |
| 2 | 40 m | 58.0 | 35.1 |
| 3 | 80 m | 62.2 | 33.8 |
| 4 | 120 m | 79.5 | 33.8 |
| 5 | 300 m | 87.3 | 32.3 |
| 6 | 360 m | 84.3 | 34.8 |
| 7 (=Example 1) | 1 d | 82.5 | 34.4 |
| 8 | 2 d | 75.0 | 32.0 |
| 9 | 3 d | 71.3 | 33.2 |
| 10 | 5 d | 67.4 | 31.1 |
| 11 | 7 d | 57.6 | 29.8 |
| 12 | 10 d | 56.0 | 32.5 |

As seen in Table I, when demolded concrete blocks are allowed to stand at 30° C in a moist atmosphere for a period of 2 hours to 5 days, particularly 5 hours to 1 day, the resulting cured concrete blocks exhibit satisfactory compressive strength.

EXAMPLE 3

The following cement mortar composition was kneaded by using a mortar mill.

| | |
| --- | --- |
| Portland cement | 10.2 kg |
| Alumina cement | 1.8 kg |
| Finely divided silica | 2.0 kg |
| Silica sand coarse grain | 3.0 kg |
| Perlite | 2.0 kg |
| Sodium citrate | 20 g |
| Sodium alkylarylsulfonate | 200 ml |
| Water | 6.0 l |

Then, 0.5 kg of calcium hydroxide was added to the kneaded cement mortar. The mixture was kneaded and immediately thereafter placed in a mold to obtain a block specimen. Twenty minutes later the concrete block so formed was removed from the mold. The demolded concrete block exhibited an initial compressive strength of 22 kg/cm$^2$. The block was allowed to stand in a water bath at 40° C for 6 hours. Then the block was cured in an autoclave at 180° C and 10 atm. for 8 hours. After being dried, the block was tested for its strengthes. It had a specific gravity of 1.48 and exhibited a compressive strength of 320 kg/cm$^2$ and a bending strength of 83 kg/cm$^2$.

EXAMPLE 4

Following the general procedure set forth in Example 1, light-weight foamed concrete blocks, having specific gravities different from each other, were prepared by varying the amounts of the foaming agent and water. The bending strength and the compressive strength of the concrete blocks were determined and were as shown by curve $a$ in FIGS. 1 and 2, respectively.

The above test was repeated on two types of commercially available light-weight foamed concrete blocks, one being ALC(Autoclaved light-weight concrete, SIPOREX, trade name) and the other being PM Light (trade name, supplied by Contec Co.). The results of these tests also shown in FIGS. 1 and 2.

As seen in FIGS. 1 and 2, the light-weight foamed concretes of the invention are superior in bending strength to the two commercially available light-weight foamed concretes. The former concretes have a compressive strength approximately similar to PM Light and greater than ALC.

Comparative Example 1

Following the general procedure set forth in Example 1, light-weight foamed concrete blocks were prepared wherein the ratio by weight of Portland cement to alumina cement was set at 20/1 and 5/2 instead of 4/1 and the amount of calcium hydroxide was 20% by weight based on the weight of alumina cement. When the Portland cement/alumina cement ratio was 20/1, the block cast was incapable of being removed from the mold even when 30 minutes had elapsed. When the Portland cement/alumina cement ratio was 5/2, a light-weight foamed concrete block could be obtained but exhibited a specific gravity of 0.612, a compressive strength of 57.3 kg and a bending strength of 11.5 kg/cm$^2$. Obviously this concrete block was inferior to that in Example 1.

What we claim is:

1. A process for manufacturing concrete articles of improved initial strength and long-term strength from a mixture containing a hydraulic cement composition capable of forming predominantly tobermorite group crystalline calcium silicate hydrate, which comprises the steps of:

(a) setting initially in a mold at a temperature of not higher than 40° C said mixture containing the hydraulic cement composition, 10 to 35% by weight, based on the weight of said hydraulic cement composition, of alumina cement, and 5 to 30% by weight, based on the weight of the alumina cement and expressed in terms of the weight of calcium hydroxide or calcium oxide;
(b) after demolding the concrete so formed, allowing the concrete to stand at a temperature of not higher than approximately 40° C for a period of 2 hours to 5 days, and then
(c) curing the concrete in an autoclave at a temperature of 150° to 200° C and saturated steam pressure for a period of 3 to 10 hours.

2. A process according to claim 1 wherein said initial setting is carried out at a temperature of 20° to 40° C.

3. A process according to claim 1 wherein the demolded concrete is allowed to stand at a temperature of approximately 20° C to approximately 40° C in a moist atmosphere of 100% relative humidity.

4. A process according to claim 1 wherein the demolded concrete is allowed to stand for a period of 5 hours to 1 day.

5. A process according to claim 1 wherein the concrete is cured at a temperature of 160° to 180° C.

* * * * *